Jan. 2, 1968  J. K. KOWALCZYNSKI  3,361,911
SYSTEM FOR MEASURING THE MASS OF MATERIAL BY THE DETECTION
OF RADIATION SCATTERED BY THE MATERIAL
Filed April 22, 1963  3 Sheets-Sheet 3

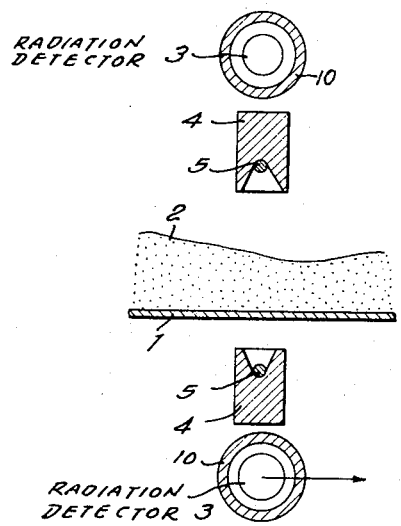
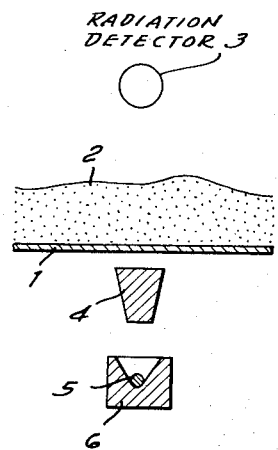
FIG. 4   FIG. 5
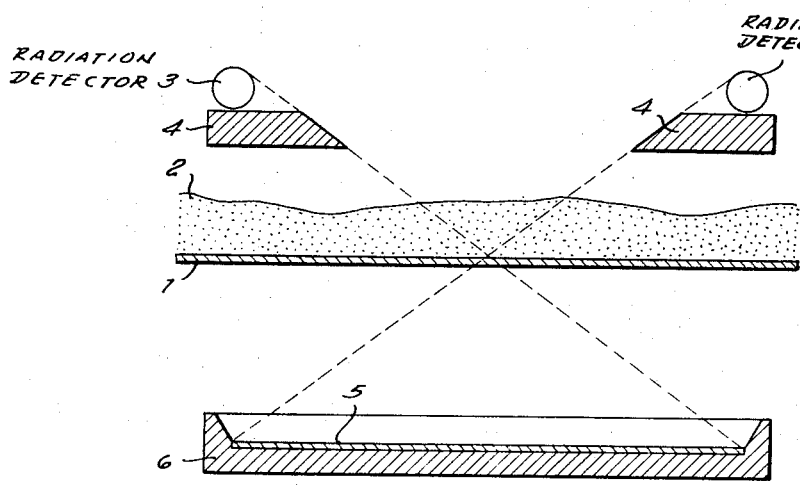
FIG. 6

INVENTOR
Jerzy Klemens Kowalczynski
BY
Michael J. Striker
ATTORNEY

з,361,911
Patented Jan. 2, 1968

3,361,911
SYSTEM FOR MEASURING THE MASS OF MATERIAL BY THE DETECTION OF RADIATION SCATTERED BY THE MATERIAL
Jerzy Klemens Kowalczynski, Ulica Malarska 7, Warsaw, Poland
Filed Apr. 22, 1963, Ser. No. 274,769
Claims priority, application Poland, Apr. 27, 1962, 46,809
4 Claims. (Cl. 250—83.3)

The below described system is destined for measuring the quantity of a material, being transported within a given time by conveyors, chutes, spouts or other similar appliances. The operation of this system is based on the phenomenon of the gamma quantum dissipation in a matter.

In known apparatus for similar measurements the impulses from detectors are suitably shaped and normalized in electronic assemblies.

According to the invented system these assemblies are superfluous and the electronic apparatuses of an equipment can be reduced to a minimum, necessary for normal functioning of a detector. This system can be utilized when the average mass of the transported material per unit of surface on which it lies or at which it slides down does not exceed the value of about 25 g./sq. cm. on any chosen section of a stream.

The essence of this invention consists in obtaining such conditions, by utilizing the measuring system with the below described properties (in result of eliminating the primary radiation), at which the number of impulses, emitted by the detectors in a given time unit will be proportional (after subtracting the background) to the mass of material transported in this time unit, independently of the shape of the transported material. This makes the above mentioned shaping or normalizing appliances in the electronic assemblies unnecessary.

As a gamma quantum detector a G-M counter, an ionization chamber or other similar appliances can be used. In practical use the most convenient detector is the G-M counter. In measuring systems it is possible to utilize a system of several cylindrical G-M counters (instead of a single long one) positioned along a common axis and connected in parallel. Such an assembly is treated as one counter.

The most convenient source of radiation from the known isotopes is the $Co^{60}$.

Let the $n$ stay for the frequency of impulses from the counter when there is no transporting material (background) in the reach of the measuring system. If in a time $t$ the counter has sent to the recording system a summarized number of impulses N then the mass M of the transported material will be found from the following formula:

$$M = a(N - nt) \qquad (1)$$

where: $a$—conversion coefficient which must be found from experience for each measuring equipment. It is evident that this coefficient depends also upon the selection of the unit system.

The enclosed drawings illustrate some examples of the system according to the invention. FIG. 1 shows the cross-section of a device according to the present invention. The oblong section of the system with linear source is shown in FIG. 2. This section is made in a plane, parallel to the sense of movement of the weighed mass and perpendicular to the axis of the detector. FIG. 3 shows the same section of the system with a flat source. In this case the transverse dimensions of the diaphragm are determined exactly (by dash-lines).

FIGS. 4, 5 and 6 show longitudinal cross-sections of some further examples of the measuring systems according to the invention. FIG. 4 and FIG. 5 correspond to alternative embodiments with a linear source and FIG. 6 with a flat source. The detectors in FIG. 4 and FIG. 6 are interconnected in parallel and have one common system of supply, amplification and counting.

The numbers on all figures have the following meaning:

1—base of the material (conveyor belt, or the like);
2—material to be transported;
3—ionizing radiation detector;
4—detector's lead diaphragm or radiation shield, absorbing the primary quanta, i.e. indissipated ones;
5—source of gamma rays or radiation source;
6—lead nest of the source;
7—(in FIG. 1 only) supply and amplifying apparatuses for a detector (e.g. computer, current circuit or the like);
8—(on FIG. 1 only) indicator for indicating the quantity of transported material (e.g. electro-mechanic number stamp, autographic apparatus and similar);
9—(on FIG. 4 only) an additional dissipation or additional radiation shield.

The length of detectors, diaphragms and linear sources (in case of a flat radiation source—the width of the sources) is approximately the same and comparable with the projected width of the base (belt, chute or the like).

Basically this length should be about 10–20% greater than the maximal width of the moved material stream. The elements 3, 4, 5 and 6 have an axial symmetry. In FIGS. 2–6 their axes are perpendicular to the plane of the figure. Due to this situation the number of impulses, emitted by the detectors does not depend on the shaping of the transported substance at a given mass on the tested section of distance.

Figure 2:
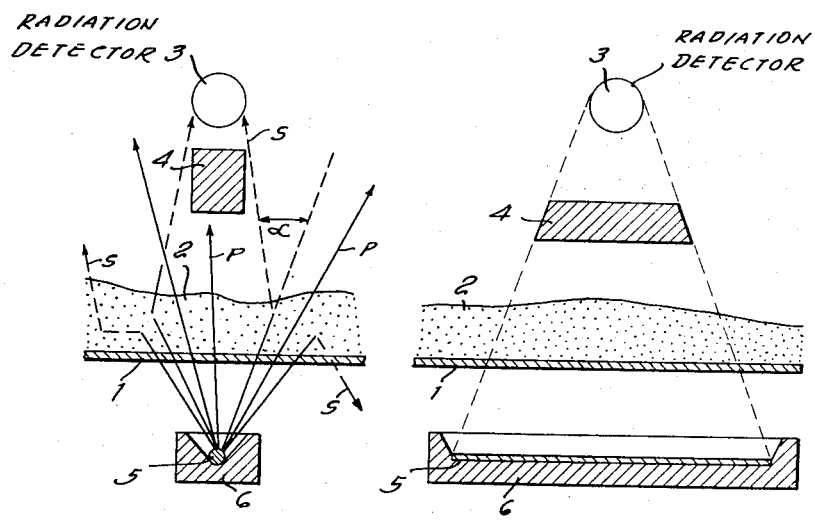
Figure 3:
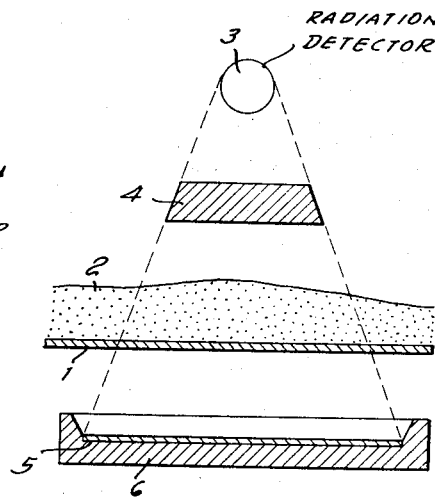
Figure 7:
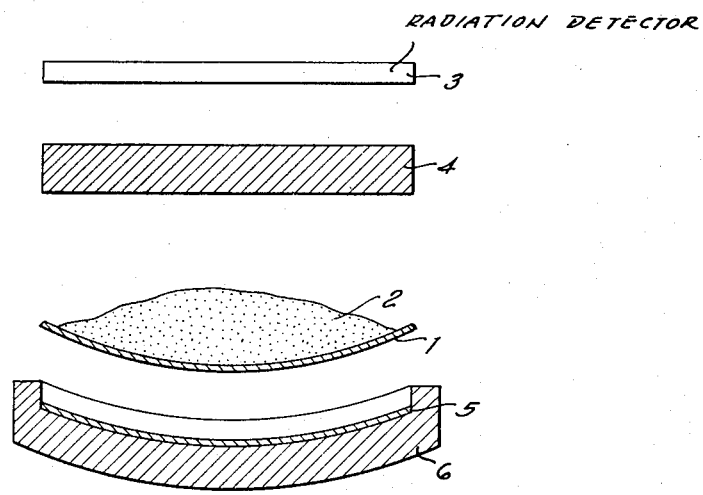
FIG. 7 shows a cross-section of a modification of both alternatives according to the invention. The radiation source (a linear one or a flat one) is here bent.

The principle of functioning of the appliance is elucidated on the basis of FIG. 2. The direction of radiation from the source 5 is determined by the dimensions of the element 6. The quanta penetrate partially through the base 1 as well as the material 2 resting on it and run further in the manner of primary radiation. The primary radiation emitted from the source 5 does not reach the detector 3 as it is almost totally absorbed by the diaphragm 4. Some part of quanta, dissipated or scattered in a lengthwise area of the stream of material 2 transported on the conveyor 1, as indicated by the broken lines S in FIG. 2 will pass at opposite sides of the radiation shield 4 and impinge on the detector 3. The correlation between the energy of the incident quanta and the probability that it will be scattered by an angle $\alpha$ is given by the well known formula for the different cross sections for the Compton effect. The more material rests on the base the more quanta are received by this detector.

In the majority of practically occurring situations a comparatively great number of soft quanta, which would detrimentally affect the exactness of measurement, can be produced by the source of radiation in environment of the system. In such a case it is advisable to surround the detector with a lead jacket or additional shield 10 of a suitable thickness. It will absorb the soft radiation but pass the majority of the hard radiation therethrough.

In case of applying the system according to the invention to a conveyor the functioning of the instrument 8 can be synchronized with its movement, e.g. so that a recording drum revolves at a speed, proportional to the momentary speed of the belt. The quantity of impulses, emitted from the detector during a short period of time is however independent from the movement of material, depending only on the size of the bulk mass, placed in a near distance. However if there are conditions, guaranteeing a constant flow speed of an important substance in the area, tested by the system, then the instrument 8 can function self-containedly. The devices 7 and 8 are not essential in the invention and therefore they are not shown in FIGS. 2–7. Connection of detectors 3 with the systems 7, 8 as on FIG. 1 is symbolized by an arrow.

Figure 1:
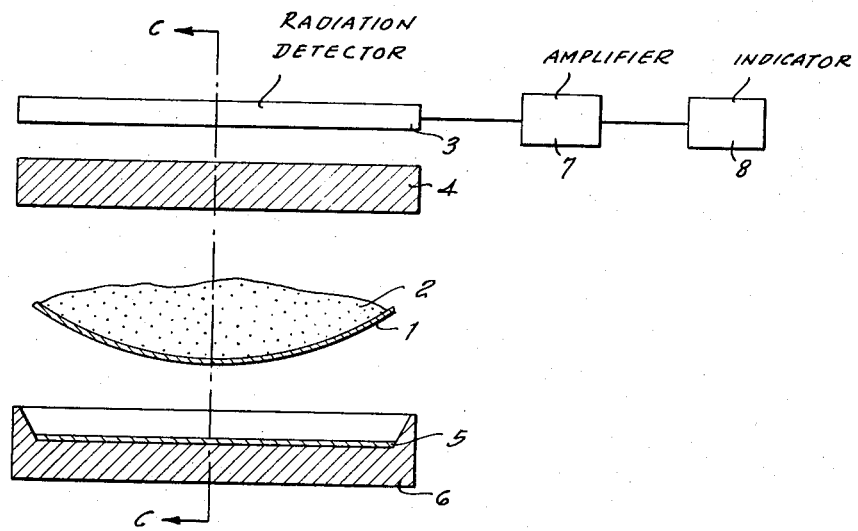
Figure 8:
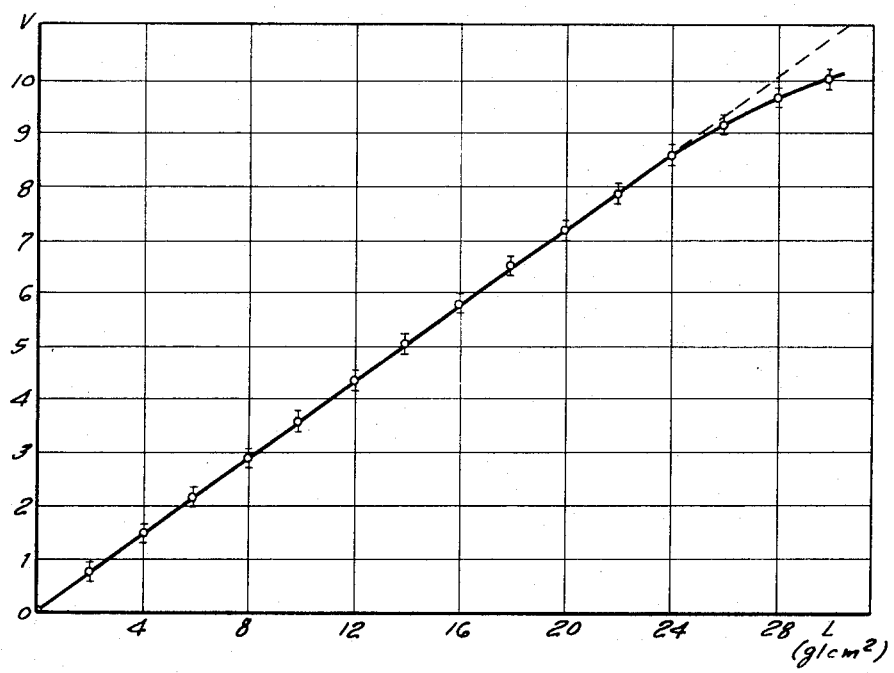
FIG. 8 is a diagram illustrating the measurements obtained with the system of the present invention.

FIG. 8 shows the results of measurements carried out on various materials with an instrument, built according to the scheme as shown on FIGS. 1 and 2. The measurements have been carried out with a computer and by means of a current system with a vacuum tube voltmeter (elements 7, 8 in FIG. 1). In the first case the values V on the vertical axis stand for the frequency of impulses in the relative scale (after subtracting the background) in the set of G-M counters. In the second case the value V is the value of current (without a background in a relative scale) flowing through a resistance connected in series in the circuit of computers. In both cases the background amounted: $V=1.8$. The values L on the horizontal axis stand for the thickness of material in g./sq. cm. (proportional to the mass) transported in any moment on the belt in an area, radiated by the source 5. The measured points have been received with various formations of the material for a determinate L. It has been stated that the value V at a given L does not depend at all on the manner of positioning of the mass on a belt. The shape of the $V/L$ characteristic, obtained from measurements with a computer was the same as the shape of the characteristic, obtained by means of a current system. As it is shown on FIG. 8 the function $V/L$ is substantially linear metal when the L surpasses 25 g./sq. cm. The relative error of weighing is determined approximately by the formula:

$$d = b \cdot \sqrt{\frac{u}{V \cdot A \cdot M}} \qquad (2)$$

where:

$u$—speed of the moving material,
$V$—active capacity of a set of counters,
$A$—activity of a source,
$M$—measured mass,
$b$—coefficient of proportionality, depending on the chosen system of units and recording apparatuses. E.g. when applying the conversion factor and the following values for parameters of (2): $u=2$ m./sec., $V=200$ cu. cm., $A=5$ mc. one receives: $d=1\%$ for $M=10t$, $d=0.3\%$ for $M=100t$, $d=0.1\%$ for $M=1000t$, etc.

I claim:

1. A system for measuring the mass of a stream of material moving in a given lengthwise direction generally in a plane and having a substantial width in said plane perpendicular to said lengthwise direction of its movement, said system comprising:

a radiation source at one side of said plane of movement of the material and extending across substantially the full width of said stream and producing radiation which impinges on said material across said full width of said stream throughout a substantial dimension thereof in said lengthwise direction;

a radiation detector at the opposite side of said plane of movement of the material extending across substantially the full width of said stream;

and a radiation shield extending across substantially the full width of said stream between said radiation source and said radiation detector and operative to substantially completely absorb all primary radiation passing from said source directly through said material to said shield so that said radiation detector responds only to radiation scattered by said material at either side of said shield in said lengthwise direction.

2. A system for measuring the mass of a stream of material moving in a given lengthwise direction generally in a plane and having a substantial width in said plane perpendicular to said lengthwise direction of its movement, said system comprising:

a radiation source at one side of said plane of movement of the material and extending across substantially the full width of said stream and producing radiation which impinges on said material across said full width of said stream throughout a substantial dimension thereof in said lengthwise direction;

a radiation detector at the opposite side of said plane of movement of the material extending across substantially the full width of said stream;

a radiation shield extending across substantially the full width of said stream between said radiation source and said radiation detector and operative to substantially completely absorb all primary radiation passing from said source directly through said material to said shield so that said radiation detector responds only to radiation scattered by said material at either side of said shield in said lengthwise direction;

and an additional radiation shield shielding said radiation detector from soft radiation and at the same time passing hard radiation scattered by the material in said stream toward said radiation detector.

3. A system for measuring the mass of a stream of material moving in a given lengthwise direction generally in a plane and having a substantial width in said plane perpendicular to said lengthwise direction of its movement, said system comprising:

a radiation source at one side of said plane of movement of the material and extending across substantially the full width of said stream and producing radiation which impinges on said material across said full width of said stream throughout a substantial dimension thereof in said lengthwise direction;

a radiation detector at the opposite side of said plane of movement of the material extending across substantially the full width of said stream;

and a radiation shield at said opposite side of said plane of movement of the material extending across substantially the full width of said stream between the stream and the radiation detector and operative to substantially completely absorb all primary radiation from said source passing through said stream of material, whereby said radiation detector responds only to radiation scattered by said material at either side of said shield in said lengthwise direction.

4. A system for measuring the mass of a stream of material moving in a given lengthwise direction generally in a plane and having a substantial width in said plane perpendicular to said lengthwise direction of its movement, said system comprising:

a radiation source at one side of said plane of movement of the material and extending across substantially the full width of said stream and producing radiation which impinges on said material across said full width of said stream throughout a substantial dimension thereof in said lengthwise direction;

a radiation detector at the opposite side of said plane of movement of the material extending across substantially the full width of said stream;

a radiation shield at said opposite side of said plane of movement of the material extending across substantially the full width of said stream between the stream and the radiation detector and operative to substantially completely absorb all primary radiation from said source passing through said stream of material so that said radiation detector responds only to radiation scattered by said material at either side of said shield in said lengthwise direction;

and an additional radiation shield surrounding said radiation detector and effective to absorb soft radiation and at the same time to pass hard radiation scattered by the material in said stream to said radiation detector.

References Cited

UNITED STATES PATENTS

| | | | |
|---|---|---|---|
| 2,425,512 | 8/1947 | Crumrine | 250—83.3 |
| 2,954,811 | 10/1960 | Hensgen et al. | 250—83.3 |
| 2,971,461 | 2/1961 | Bradford et al. | 250—83.3 |
| 2,997,586 | 8/1961 | Scherbatskoy | 250—83.3 |

OTHER REFERENCES

"Gaging Gas Density With Fast Charged Particles," by B. W. Schumacher, from "Nucleonics," vol. 18, No. 10, October 1960, pages 106, 109, 110, 112 and 114.

"Weighing Bagasse and Sugar With Gamma Rays," by G. O. Burr et al., from "Hawaiian Sugar Technologists," 1954, pp. 124–126.

WILLIAM F. LINDQUIST, *Primary Examiner.*

RALPH G. NILSON, *Examiner.*